(12) United States Patent
Wang et al.

(10) Patent No.: US 10,878,159 B1
(45) Date of Patent: Dec. 29, 2020

(54) INSERTION AND PLACEMENT OF PIPELINE REGISTERS IN SIGNAL PATHS OF AN INTEGRATED CIRCUIT

(71) Applicant: Xilinx, Inc., San Jose, CA (US)

(72) Inventors: Zhiyong Wang, Cupertino, CA (US); Kai Zhu, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 16/503,002

(22) Filed: Jul. 3, 2019

(51) Int. Cl.
*G06F 30/392* (2020.01)

(52) U.S. Cl.
CPC .................. *G06F 30/392* (2020.01)

(58) Field of Classification Search
USPC ....................................................... 716/124
See application file for complete search history.

(56) References Cited

U.S. PATENT DOCUMENTS 7,200,822 B1 * 4/2007 McElvain ............. G06F 30/327
716/101
7,383,426 B2 * 6/2008 Chung .................. G06F 9/3851
712/220
8,893,071 B1 11/2014 Gaide

OTHER PUBLICATIONS

U.S. Appl. No. 16/255,496, filed Jan. 23, 2019, Fraisse, H., et al., Resolving Timing Violations in Multi-Die Circuit Designs, San Jose, CA USA.

* cited by examiner

*Primary Examiner* — Bryce M Aisaka
(74) *Attorney, Agent, or Firm* — Crawford Maunu PLLC (57) ABSTRACT

Disclosed approaches for pipelining signal paths in an integrated circuit (IC) device include receiving by a design tool a circuit design to be implemented in the integrated circuit device. The design tool identifies signals of the circuit design that require pipeline registers between drivers and loads of the signals, and relaxes an initial timing requirement to a relaxed timing requirement. The design tool determines respective numbers of pipeline registers to insert between each driver and load of each of the signals based on the relaxed timing requirement. The design tool inserts in the circuit design, respective sets of the respective numbers of pipeline registers between each driver and load of each of the signals. The design tool places the respective sets of the pipeline registers on the IC device using the initial timing requirement.

20 Claims, 8 Drawing Sheets

INSERTION AND PLACEMENT OF PIPELINE REGISTERS IN SIGNAL PATHS OF AN INTEGRATED CIRCUIT

TECHNICAL FIELD

The disclosure generally relates to pipelining signal paths in an integrated circuit device.

BACKGROUND

Many integrated circuits have pipelined signal paths in order to satisfy timing requirements. However, instantiating pipeline registers in a circuit design can be problematic with the increasing density of circuit integration and the growing size of circuit designs.

Some circuit designs are implemented on multi-die integrated circuit devices/packages, and various signal paths can traverse multiple dice. For example, the VERSAL™ adaptive compute acceleration platform (ACAP) from XILINX, Inc. has multiple integrated circuit dice that provide programmable logic, processor cores, memory circuits, vector processor circuits, and high-speed input/output (I/O) circuits. The VERSAL ACAP is one example of a device that can be referred to as a "system-on-chip" (SoC) or "system-in-package" (SiP).

An SoC can include high-bandwidth memory and a circuit design implemented on the SoC can have tens-of-thousands of signal paths involved in accessing the memory. Circuits implemented in the programmable logic of the SoC may require pipeline registers in the signal paths to and from the memory in order to satisfy timing requirements. However, determining suitable numbers of pipeline registers and suitable placements of the pipeline registers can be a formidable task given the number of signal paths.

SUMMARY

A disclosed method of pipelining signal paths in an integrated circuit (IC) device includes receiving by a design tool executing on a computer system, a circuit design to be implemented in the integrated circuit device. The design tool identifies signals of the circuit design that require pipeline registers between drivers and loads of the signals, and relaxes an initial timing requirement to a relaxed timing requirement. The design tool determines respective numbers of pipeline registers to insert between each driver and load of each of the signals based on the relaxed timing requirement. The design tool inserts in the circuit design, respective sets of the respective numbers of pipeline registers between each driver and load of each of the signals. The design tool places the respective sets of the pipeline registers on the IC device using the initial timing requirement.

A disclosed system includes one or more computer processors and a memory arrangement coupled to the one or more computer processors. The memory arrangement is configured with instructions for pipelining signal paths of a circuit design to be implemented on an integrated circuit (IC) device. The instructions when executed by the one or more computer processors cause the one or more computer processors to perform operations including receiving a circuit design to be implemented on the IC device. Execution of the instructions causes the one or more processors to identify signals of the circuit design that require pipeline registers between drivers and loads of the signals and to relax an initial timing requirement to a relaxed timing requirement. Execution of the instructions causes the one or more processors to determine respective numbers of pipeline registers to insert between each driver and load of each of the signals based on the relaxed timing requirement. Execution of the instructions causes the one or more processors to insert respective sets of the respective numbers of pipeline registers between each driver and load of each of the signals. Execution of the instructions causes the one or more processors to place the respective sets of the pipeline registers on the IC device using the initial timing requirement.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which.

DETAILED DESCRIPTION

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

The disclosed approaches for pipelining signal paths in an integrated circuit (IC) device improve the operation of a computer system in executing a design tool that pipelines signal paths of a circuit design, as well as simplifying the arduous task of pipelining the signal paths. The disclosed approaches improve operation of the computer system executing the design tool by way of improved modeling of the IC device and employing parallel threads of execution in placing the sets of pipeline registers.

According to the disclosed approaches, a design tool executing on a computer system inputs a circuit design to be implemented in the IC device. Based on signals within the circuit design tagged for pipelining, the design tool identifies those signals that are to have pipeline registers inserted between drivers and loads.

The design tool uses relaxed timing requirements in determining the numbers of pipeline registers to insert on the signal paths. The relaxation can be based on an upper limit specified in the design for the maximum number of pipeline registers that can be inserted on a signal path. The upper limit is first used to relax timing requirements by increasing an initial clock period (and decreasing the required clock frequency). The increased clock period then reduces the number pipeline stages calculated for a signal path, as compared to the number of pipeline stages that would be calculated using the initial clock period.

Once the numbers of pipeline stages have been determined for the signal paths, the design tool modifies the circuit design by inserting a set of pipeline registers on each of the signal paths according to the calculated number of stages for that signal. The design tool then reverts to the initial timing constraint for placing the sets of pipeline registers on the IC device.

Figure 1:
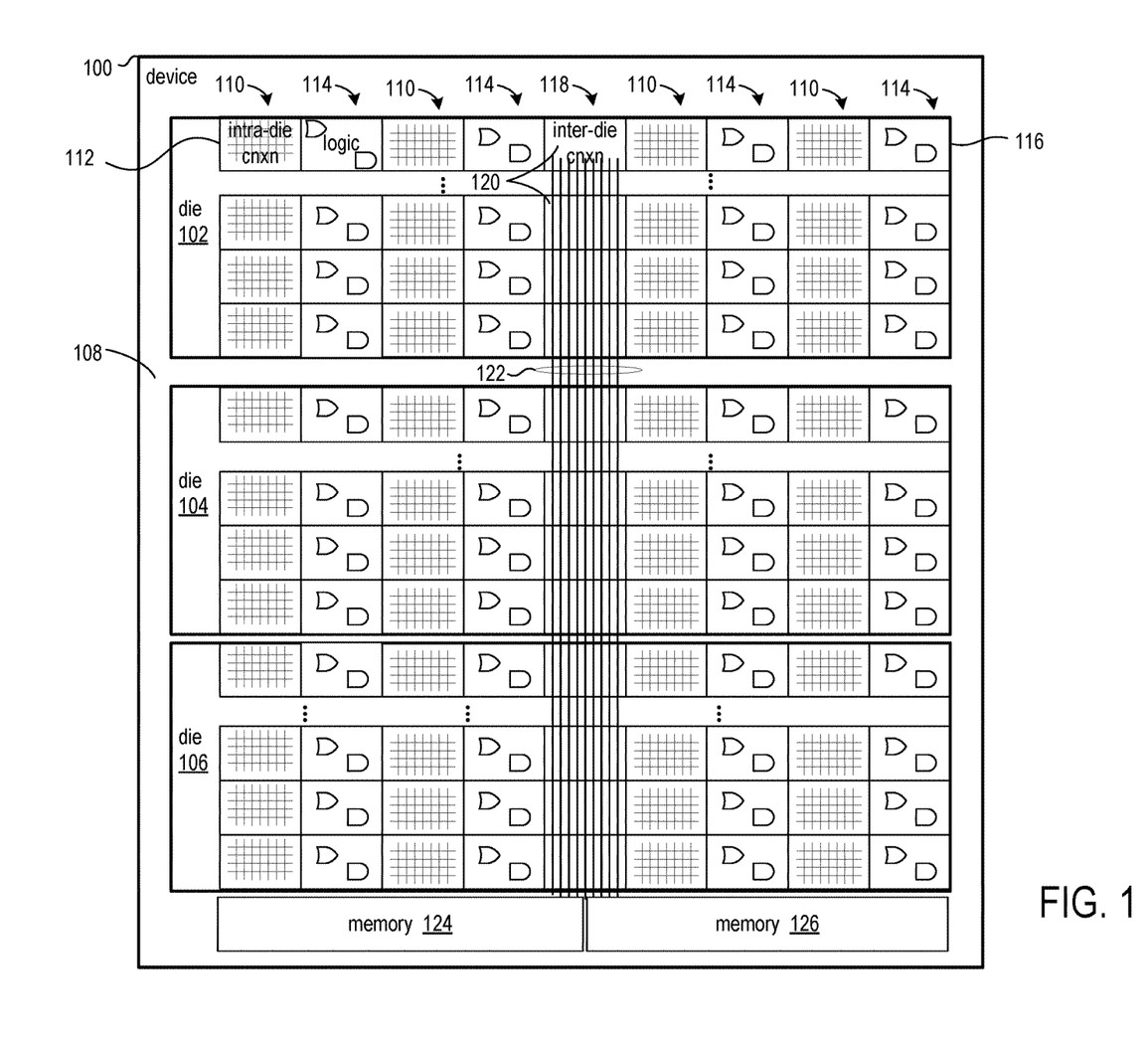
FIG. 1 shows an exemplary IC device having multiple integrated circuit dice disposed on a silicon substrate.

FIG. 1 shows an exemplary IC device 100 having multiple integrated circuit dice 102, 104, 106 disposed on a silicon substrate 108. Though the disclosed approaches are described in the context of IC devices having multiple dice, the pipelining methods can be applied to single die IC devices as well.

Each die 102, 104, 106 of the exemplary device 100 has columns 110 of programmable intra-die connection tiles 112, and columns 114 of programmable logic tiles 116. Each die further includes a column 118 having inter-die connection tiles 120 through which signals can be routed between dice. Actual programmable IC dice can have many more columns of programmable intra-die connection and programmable logic tiles, as well as additional columns of inter-die connection tiles, and the disclosed approaches are applicable thereto. Moreover, actual programmable IC dice may include columns having both programmable logic tiles and inter-die connection tiles. The inter-die connection tiles can be located at the bottom or top of a column in order to simplify layout of signal lines in the interposer. The dice may further include digital signal processing tiles, input/output tiles, memory blocks etc.

Based on a circuit design, the intra-die connection tiles 112 are programmable to create signal paths between selected circuit elements on a die, and the programmable logic tiles 116 are programmable to create logic functions. The inter-die connection tiles 120 are programmable to create signal paths between circuit elements on different ones of the dice. The lines 122 illustrate the signal lines for carrying inter-die signals according to an implemented circuit design. Though only 9 inter-die interconnect lines are shown, an actual device would have many more inter-die interconnect lines. The inter-die signal lines provide for direct connections between two dice. In some applications, the connections are only between adjacent dice. In other applications, connections may be provided between non-adjacent dice.

The IC device 100 further includes dice 124 and 126 that provide high bandwidth random access memory (RAM) circuitry. The data signals interfacing with the memory 124 and 126 are often implemented as buses. In instances in which the memory busses are implemented in programmable logic, pipeline registers may be required to allow application circuitry to function at the target high clock frequency. The number of signals for which pipeline registers are to be inserted for supporting high bandwidth memory can number in the tens of thousands. Manually inserting the needed pipeline registers in order to meet the target clock frequency may not be feasible, and doing so may risk insertion of a large number of unneeded registers.

The dice 102, 104, and 106 are arranged side-by-side in a stacked arrangement on the silicon substrate. Stacking the dice, such as field programmable gate array (FPGA) dice, enables manufacture of large capacity devices by assembling multiple, better yielding, smaller dies on a silicon interposer and manufactured in a stable and proven process.

In an exemplary device, the dice 102, 104, and 106 are identical to one another, though the disclosed approaches are applicable to dissimilar die. Each die can be structured to include multiple clock regions (not shown), and each clock region can include multiple columns 110 of intra-die connection tiles and multiple columns 114 of programmable logic tiles. Two or more columns 118 of inter-die connection tiles can be provided for each clock region. For purposes of illustration only, the height of each column 110 and 114 can be 60 intra-die connection tiles 112.

Figure 2:
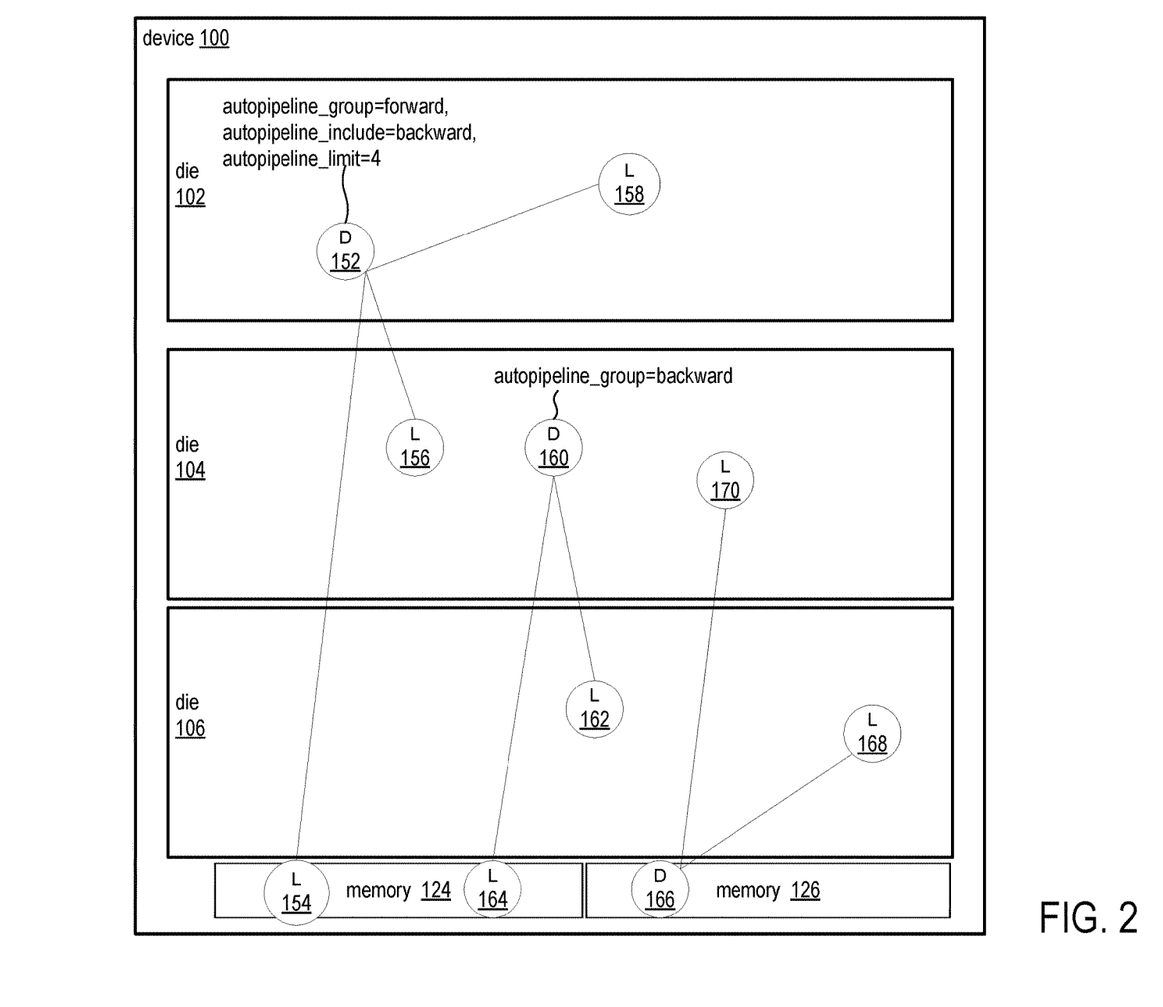
FIG. 2 shows three examples of nets of a circuit design having signals to be pipelined.

FIG. 2 shows the exemplary IC device 100 and three examples of nets of a circuit design having signals to be pipelined. A first net has driver 152 connected to loads 154, 156, and 158; a second net has driver 160 connected to loads 162 and 164; and a third net has driver 166 connected to loads 168 and 170. Though the examples show nets having multiple loads connected to a driver, a net can consist of a single driver and a single net.

The driver and load(s) of a net can be placed on the same die or on different dice. For example, driver 152 is placed on die 102, load 154 is placed on memory die 124, load 156 is placed on die 104, and load 158 is placed on die 102.

In order to satisfy timing constraints of the circuit design, pipeline registers may need to be inserted on the signals of a net between the driver and the loads. For example, pipeline registers may need to be inserted on the signal path between driver 152 and load 154, on the signal path between driver 152 and load 156, and on the signal path between driver 152 and load 158. Similarly, pipeline registers may need to be inserted on the signal paths from drivers 160 and 166 to the respective loads.

In an exemplary approach, a circuit designer can specify in the source code of the circuit design those signal paths that should be considered by a design tool for insertion of pipeline registers. For example, a cell or net can have associated attributes to indicate that the signals of the net require pipeline register insertions. In one implementation, the attribute "autopipeline_group" can be associated with a cell, such as driver 152. The autopipeline_group attribute indicates that the signals driven by driver 152 are to be evaluated for insertion of pipeline registers.

Signals of other nets can be similarly evaluated by the design tool by associating the "autopipeline_include" attribute with the cells/nets. The similar evaluation can be used to insert like numbers of pipeline registers on the signal paths of the nets. For example, driver cell 152 has the associated autopipeline_group attribute with value "forward," and the autopipeline_include attribute with value "backward." Driver cell 160 has the associated autopipeline_group attribute with value backward. The autopipeline_group attribute of driver cell 160 having the same value (backward) as the value of the autopipeline_include attribute of driver cell 152 causes the design tool to apply the same "autopipeline_limit" value (e.g., 4) to the signals of the nets. The autopipeline_limit limits the total number of pipeline registers inserted on the signal path of the nets. That is, the limit attributes limits the total number of pipeline registers inserted between a first driver and a first load of a group and between a second driver and a second load of the group to the number indicated by the limit attribute of the group. Signal paths of nets in different groups can have different numbers of pipeline registers inserted.

Figure 3:
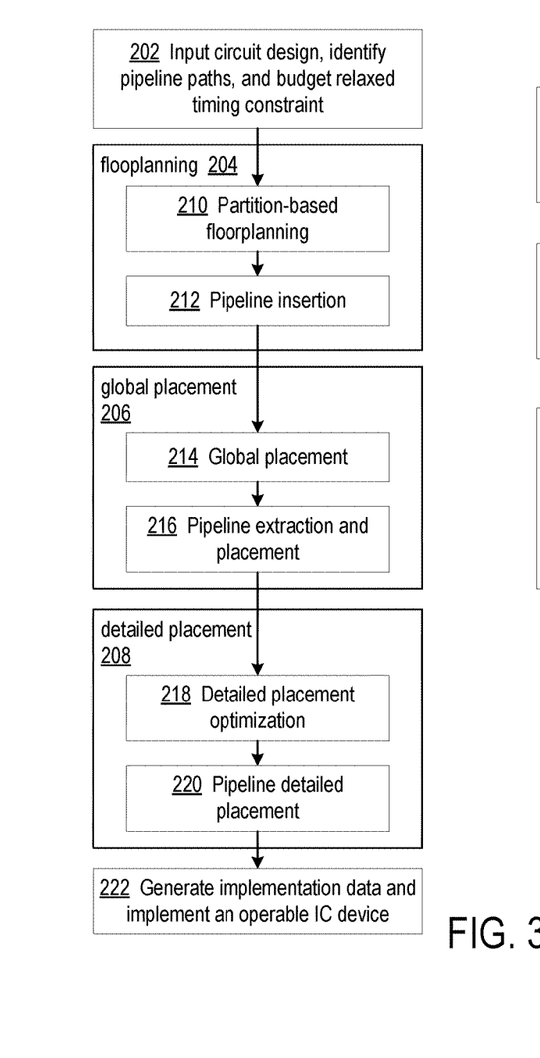
FIG. 3 shows a flowchart of an exemplary design flow process for implementing a circuit from a circuit design, including pipelining selected signals of the circuit design.

FIG. 3 shows a flowchart of an exemplary design flow process for implementing a circuit from a circuit design, including pipelining selected signals of the circuit design. The process generally includes identification of signals to be pipelined at block 202, floorplanning at block 204, global placement at block 206, detailed placement at block 208, and implementation at block 222.

At block 202, a circuit design tool inputs a circuit design and analyzes the circuit design for pipelining signal paths. In analyzing the circuit design, the design tool identifies those signals that are to be pipelined and determines a relaxed timing budget for partition-based floorplanning. The signal paths to be pipelined can be identified by detecting the presence of certain attributes associated with cells/nets of the circuit design, as explained above.

The initial timing requirement specified and input for the circuit design is relaxed for floorplanning. After auto-pipeline insertion is complete, the timing requirement is reset to the initial timing requirement. An exemplary formula to relax the timing requirement is as follows: $T_{relaxed}= T_{clock\text{-}period}*N_{limit}$, where $T_{clock\text{-}period}$ is the clock period of the initial timing requirement, and $N_{limit}$ is the value of the "autopipeline_limit" attribute described above. If no limit attribute is specified, an upper bound of 256 can be used, for example. The upper bound can be configurable in some implementations, though an upper limit of 256 has been observed to be sufficient for most applications.

In the floorplanning phase 204, at block 210 the design tool performs partition-based floorplanning of the circuit design using the relaxed timing requirement. The partition-based floorplanning divides the circuit design into partitions, with each partition being assigned to one of the IC dice of the device. The partition-based floorplanning employs known floorplanning algorithms operating with the relaxed timing constraint.

At block 212, the design tool determines numbers of pipeline registers to insert and inserts the registers in the circuit design. The number of pipeline registers to insert on a signal path can be determined based on the delay of the signal and the initial timing requirement. The number of pipeline registers can be computed as: delay/Tclock-period. Tclock-period is the initial timing requirement. Because the timing requirement was relaxed prior to floorplanning, the delay will be relatively large allowing insertion of registers to meet the initial timing constraint. For signals that are part of a group, the greatest number of pipeline registers determined for all the signals of the group is used as the number of pipeline registers to insert for all the signals of the group. Once the numbers of pipeline registers to be inserted are determined, the design tool modifies the circuit design (e.g., the netlist), adding the pipeline registers to the signal paths.

After the netlist modification is complete, the design tool partitions the inserted pipeline registers according to locations of the driver and load of the original signal path. The partitioning process distributes the pipeline registers based on the distance the pipeline needs to travel in each SLR. The partitioning processing generally distributes the pipeline registers to a die in proportion to the distance the signal needs to travel in the die. For example, the number of pipeline registers that will be placed on a die in which the signal is to travel over the entire die will be greater than the number of pipeline registers placed on another die in which the signal is to travel over only part of the die (e.g., FIG. 10). The partitioning process can secondarily consider other factors such as logic resource utilization.

After floorplanning, the timing constraint is restored to the originally specified timing constraint and used in the global and detailed placement phases 206 and 208. At block 214, the design tool performs global placement of the circuit design including the inserted pipeline registers using the original timing constraint. The global placement assigns circuit elements of the design to tiles of the IC device.

At block 216, the design tool refines the global placement of the inserted pipeline registers. The design tool first identifies those of the registers in the circuit design that are inserted pipeline registers. Once the inserted pipeline registers have been identified, the design tool revises placement of the inserted pipeline registers, avoiding congestion in the tiles and equally spacing the pipeline registers.

In the detailed placement phase 208, the design tool performs detailed placement and routing of the circuit design at block 218 using known approaches. At block 220, the design tool reviews the detailed placement of the inserted pipeline registers and adjusts the placement to reestablish equal spacing if pipeline registers were moved in the detailed placement and optimization process.

At block 222, the design tool generates implementation from the placed and routed circuit design available after the processing of block 220 and implements an operable IC device. The design tool can generate implementation data that can configure programmable logic and routing resources of a field programmable gate array (FPGA) or ACAP, or implementation data from which an application-specific (ASIC) can be fabricated.

Figure 4:
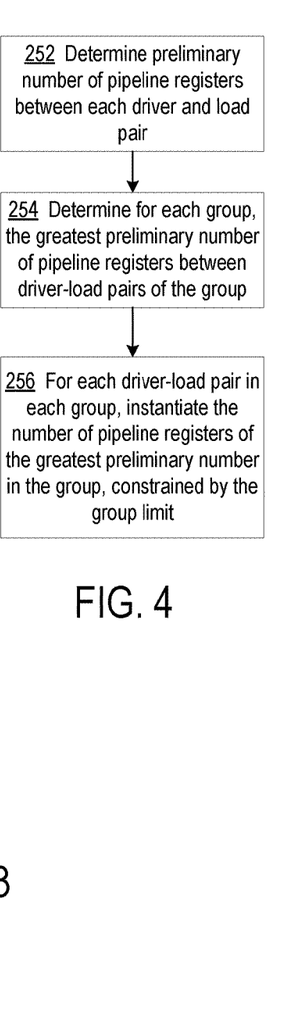
FIG. 4 is a flowchart of an exemplary process of inserting pipeline registers.

FIG. 4 is a flowchart of an exemplary process of inserting pipeline registers consistent with block 212 of FIG. 2. At block 252, the design tool computes a preliminary number of pipeline registers to insert on each of the signal paths identified for automatic pipeline insertion. According to an exemplary approach, the preliminary number of registers to be inserted is computed as the delay of the signal divided by the relaxed clock period of the clock signal controlling the signal. Additional delay can factor into the calculation for a signal that crosses an I/O column and/or inter-die connections. The number of pipeline stages/registers can be calculated as:

$$N_{stages} = \frac{T_{delay}}{T_{relaxed}} + \Delta,$$

where $T_{delay}$ is the delay of the signal based on the partition-based placement of the driver and load of the signal, and $\Delta$ accounts for number of IO column and SLR crossing.

At block 254, for each set of signal paths identified by the autopipeline_group and autopipeline_include attributes described above, the design tool determines the greatest of the preliminary numbers of pipeline registers.

At block 256, the design tool instantiates the computed numbers of pipeline registers in the identified signal paths (FIG. 2, #202) of the circuit design. For a signal path that is not part of a group, the number of pipeline registers is the preliminary number of pipeline registers computed at block 252 as limited by the value of the autopipeline_limit attribute, if specified. For the signal paths that are part of a group, the number of pipeline registers is the preliminary number of pipeline registers computed at block 254 as limited by the value of the autopipeline_limit attribute, if specified. Equal numbers of pipeline registers are instantiated on each signal path that is part of the same group.

Figure 5:
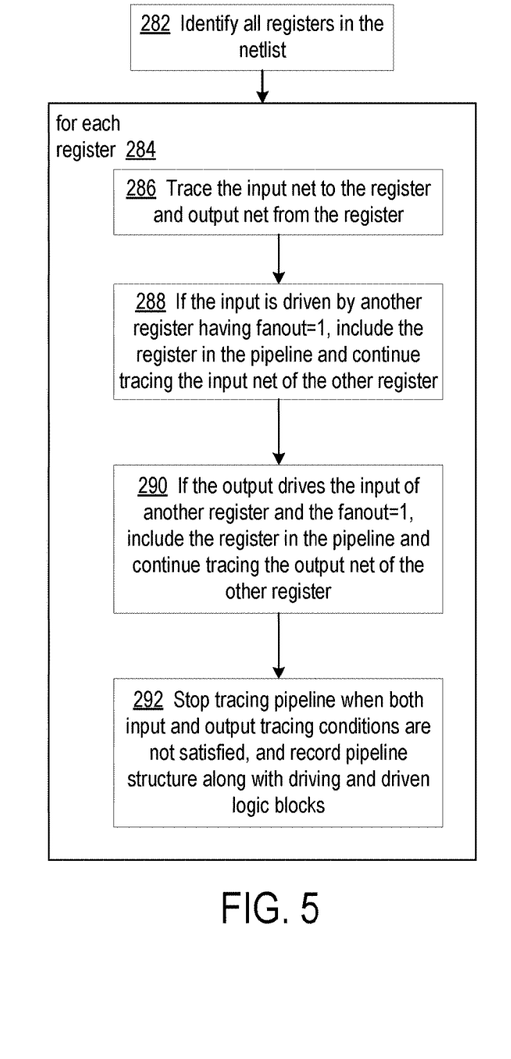
FIG. 5 is a flowchart of an exemplary process for identifying those registers of the circuit design that were inserted in the pipeline insertion process of FIG. 4.

FIG. 5 is a flowchart of an exemplary process for identifying those registers of the circuit design that were inserted in the pipeline insertion process of FIG. 4 consistent with pipeline extraction and placement of FIG. 3 (block 216). At block 282, the design tool identifies all the registers in the circuit design. For each of the registers, the process of block 284 is performed to determine if the register is part of a pipeline.

At block 286, the design tool traces the input net to the register and the output net from the register. If the register is driven by another register that has a fanout of one (the output of the other register connects only to the register in process), the register in process is tagged as a pipeline register, and the process of block 288 continues by tracing the input net of the other register.

At block 290, if the output of the register in process drives another register and the fanout of the register in process is one, the register is tagged as part of the pipeline, and the tracing at block 290 continues at the output of the other register. The tracing of a pipeline is complete at block 292 when both the register that drives the input of the register being traced has a fanout greater than one and the fanout from the register being traced is greater than one. At block 292, the design tool records data that describe the pipeline of registers, the logic block that drives the first register of the pipeline, and the logic block driven by the last register of the pipeline.

Figure 6:
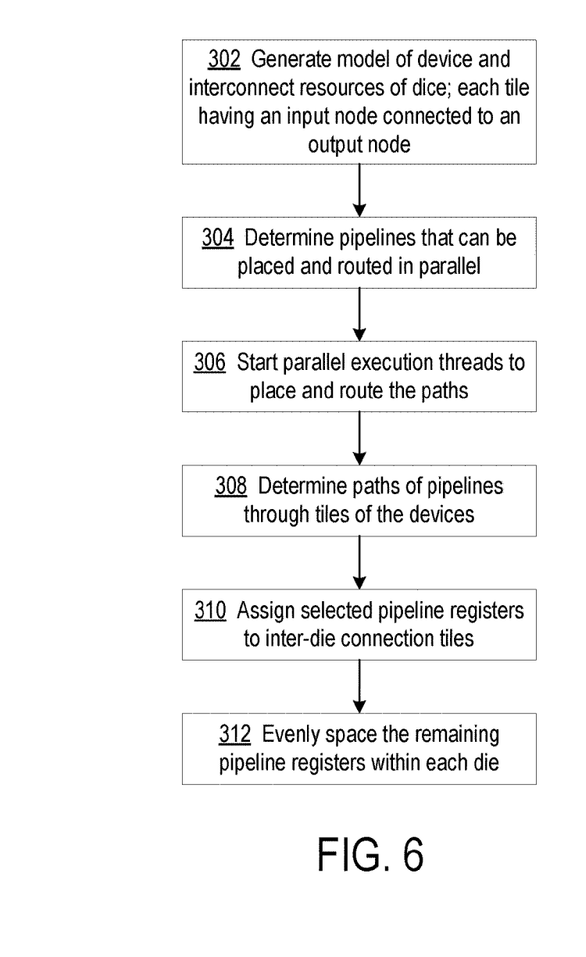
FIG. 6 is a flowchart of an exemplary process for globally placing inserted pipeline registers.
Figure 7:
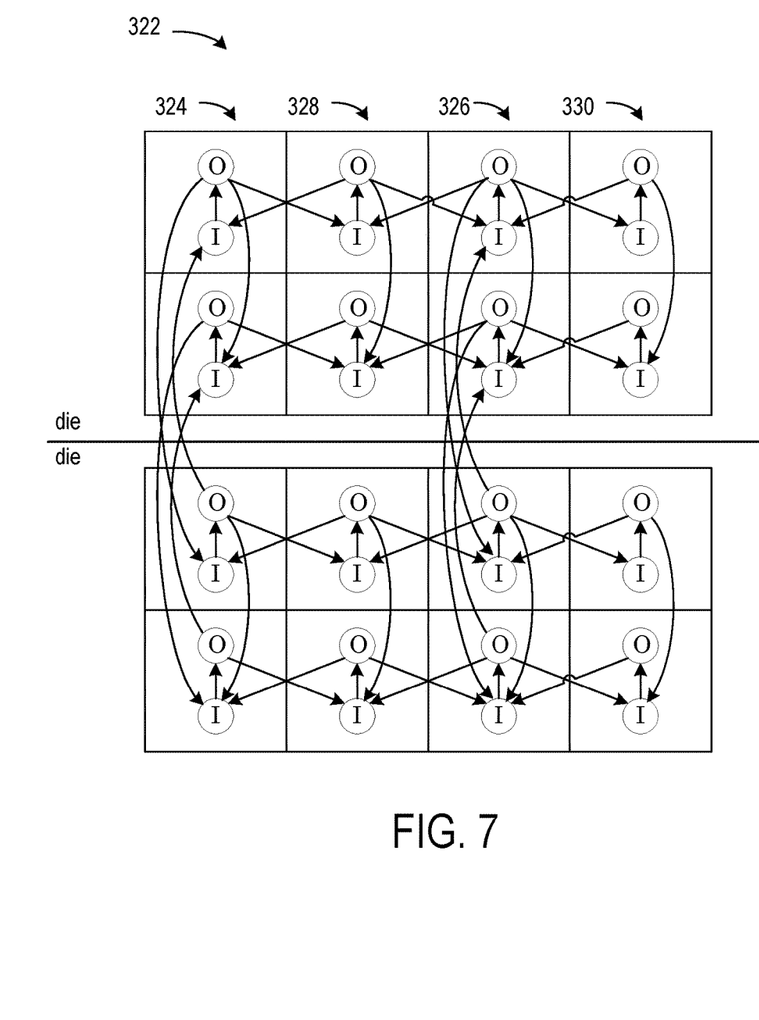
FIG. 7 shows an exemplary model of an IC device.

FIG. 6 is a flowchart of an exemplary process for globally placing inserted pipeline registers consistent with placement of the pipeline extraction and placement block 216 of FIG. 3. At block 302, the design tool generates a model of the target IC device in the memory of the host computer system. Use of the generated model improves operation of the host computer system in executing the design tool through its placement and routing phases of the inserted pipelines. FIG. 7 shows an exemplary model of an IC device consistent with the model generated at block 302 of FIG. 6.

The model 322 is representative of an IC device having two IC dice, and each of the IC dice has tiled circuitry similar to the tiled circuitry shown in FIG. 1. Columns 324 and 326 represent inter-die connection tiles, and columns 328 and 330 represent programmable logic tiles. The inserted pipeline registers can be placed in the inter-die connection tiles and the programmable logic tiles, and the model 322 can be used to track utilization of the tiles and avoid congestion, and thereby reduce placement runtime.

The model 322 represents each tile of the IC device with a single input node and a single output node. The input node represents all the possible input signal paths to the tile, and the output node represents all the possible output signal paths from the tile. Edges between the nodes represent signal paths that are available for routing a signal between resources of the tiles. The arrow heads on the edges indicate the direction that signals flow between the tiles. Each input node has only one output edge, and that output edge is connected to the output node of the same tile. Each output node has only one input edge, and the input edge from the input node of the same tile.

To further improve performance, the process of globally placing the inserted pipeline registers identifies opportunities for parallel processing. At block 304 of FIG. 6, the design tool determines paths of the circuit design that can be placed and routed in parallel. In an exemplary application, non-overlapping bounding boxes can be used to determine whether pipeline registers of different pipelines are suitable for parallel processing. For a pipelined signal, the bounding box of the signal is a rectangle defined by the location of the driver in the logic block that drives the first pipeline register and the location of the load in the logic block driven by the last pipeline register. When the congestion in the bounding box is not high, the routing path of the signal will very likely be within the bounding box. Therefore, if the bounding boxes for two signals do not overlap, the two pipelines can be processed in parallel.

At block 306, the design tool initiates parallel execution threads to place and route the pipelines, with each thread performing processing consistent with blocks 308, 310, and 312. At block 308, the design tool determines paths of the pipelines through tiles of the IC device, using the model 322 of FIG. 7 and based on lengths of signal paths between the tiles and utilization of the circuit resources of the tiles.

Based on the path determined at block 308, at block 310 the design tool assigns the selected registers to the inter-die connection tiles. At block 312, the design tool evenly spaces the pipeline registers on each of the pipelined signal paths. The design tool attempts to make the distances equal between pairs of drivers and loads on the pipelined signal path. The "equal" spacing referenced herein does not mean exactly equal, as exactly equal spacing is unlikely to be possible. Rather equal spacing as used herein means that the design tool attempts to place the registers such that the distances between successive registers of a pipeline are as close to being equal as feasible. The feasibility can be limited by availability of circuit resources and/or acceptable runtime of the design tool.

Figure 8:
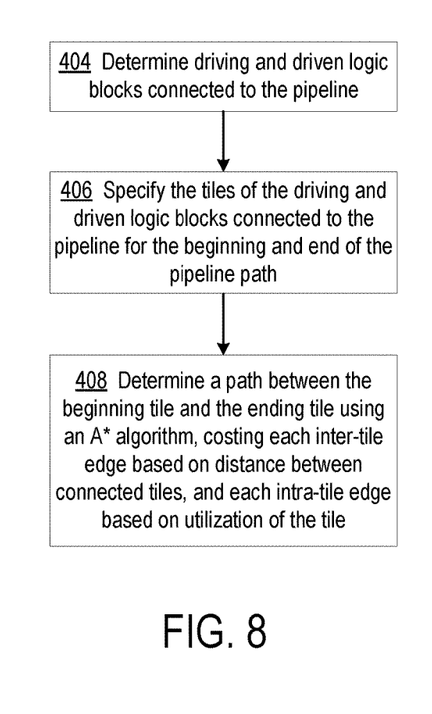
FIG. 8 is a flowchart of an exemplary process for determining a path of a pipeline register.

FIG. 8 is a flowchart of an exemplary process for determining a path of a pipeline register consistent with block 308 of FIG. 6. At block 404, the design tool determines the driving logic block and driven logic block of the pipelined signal path. That is, the design tool reads the previously recorded information of the logic blocks identified at block 292 of FIG. 5.

At block 406, the design tool determines the placement of the driving logic block and the driven logic block as established and recorded in the global placement process (FIG. 3, block 206). In the exemplary application, the placement information indicates the tiles of the IC device on which the driving logic block and the driven logic block were placed.

At block 408, the design tool constructs a path from the location of the driving logic block to the location of the driven logic block. In an exemplary approach, the path is determined using the recognized A* algorithm to find the least costly path. In the application involving tiles of an IC device, the path through tiles is determined based on congestion within the tiles and distances between tiles. A greater level of congestion imposes a greater cost, and a greater distance between tiles also imposes a greater cost. The purpose of determining the routing path is to subsequently determine placement of the pipeline registers along the routing path.

Using a device model, such as the model of inter-tile connections 322 shown in FIG. 7, the design tool can avoid and reduce congestion in placing the pipeline registers. Congestion can increase runtimes as there are fewer resource options available for placing pipeline registers. Congestion refers to a level of utilization of circuit resources within a tile. A lower level of utilization indicates lower congestion, and higher level of utilization indicates higher congestion.

The inter-die connection model improves computer performance in selecting a route of a pipelined path through simplified representation of the utilization of inter-die connection resources. The utilization can be tracked on the single edge between the input node and the output node of a tile. Each time circuit resources of a tile are used for a signal path, a cost associated with the edge from the input node to the output node of the register can be increased. When evaluating the suitability of particular tile for a pipeline path, the cost of that placement can be determined using the cost associated with the edge between the input and output nodes of that tile and the distance to that tile.

Figure 9:
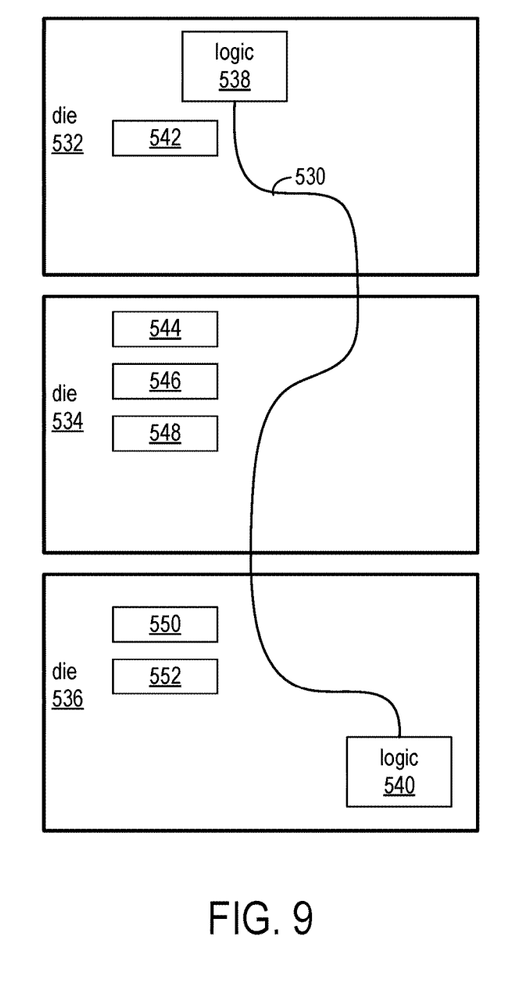
FIG. 9 shows an example of a path between a driving logic block and a driven logic block.

FIG. 9 shows an example of a path 530 between a driving logic block 538 on die 532 and a driven logic block 540 on die 536. The pipeline registers 542, 544, 546, 548, 550, and 552 are on the side of each die to illustrate that the pipeline registers have been globally placed on the dice 532, 534, and 536 but have not yet been placed on tiles of the routing path.

As shown in FIG. 6 at block 310, the design tool assigns selected ones of the pipeline registers in the path to selected inter-die connection tiles. The pipeline registers that are to be placed on inter-die connection tiles can be identified by checking whether successive registers in the pipeline have been placed on adjacent dice. For example, in FIG. 10, pipeline registers 548 and 550 are successive registers that have been placed on adjacent dice 534 and 536.

Figure 10:
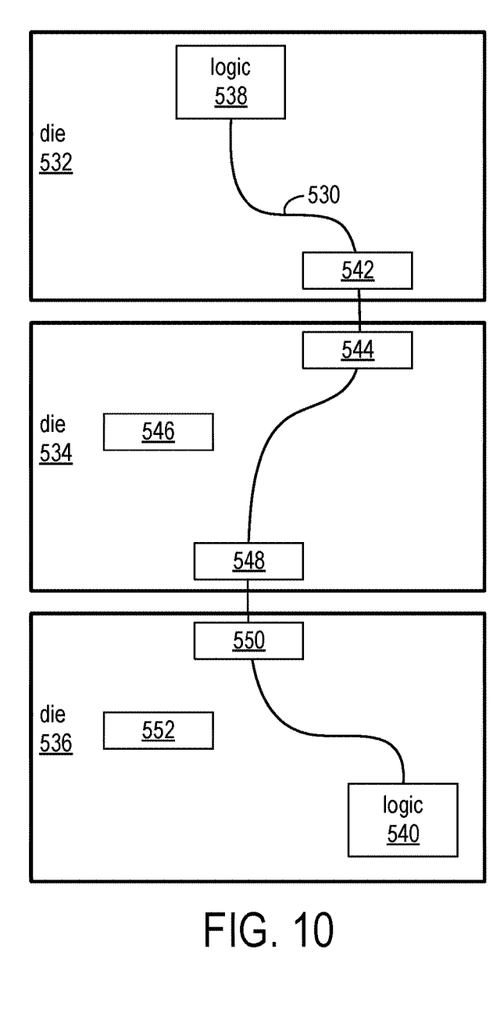
FIG. 10 shows an exemplary placement of pipeline registers on the inter-die connection tiles.

The design tool places identified pipeline registers on connected inter-die connection tiles in the adjacent die. FIG. 10 shows an exemplary placement of pipeline registers on the inter-die connection tiles. Pipeline register 542 is placed on an inter-die connection tile of die 532, and pipeline register 544 is placed on the inter-die connection tile of die 534 that connects to die 532. Similarly, pipeline registers 548 and 550 are placed on inter-die connection tiles of dice 534 and 536, respectively.

After placing the necessary pipeline registers on inter-die connection tiles, the remaining pipeline registers can be placed, as indicated by block 312 of FIG. 6. The design tool attempts to place the remaining pipeline registers such that of the distance between the successive registers in the pipeline is as equal as possible. In IC devices such as FPGAs, the interconnect delay is mostly proportional to the distance between a driver and a load. Therefore, placing the pipeline registers of a pipelined path such that the distance between any pair of successive pipeline registers A and B is approximately equal to the distance between any other pair of pipeline registers C and D can maximize the frequency of the clock driving the pipeline registers.

Figure 11:
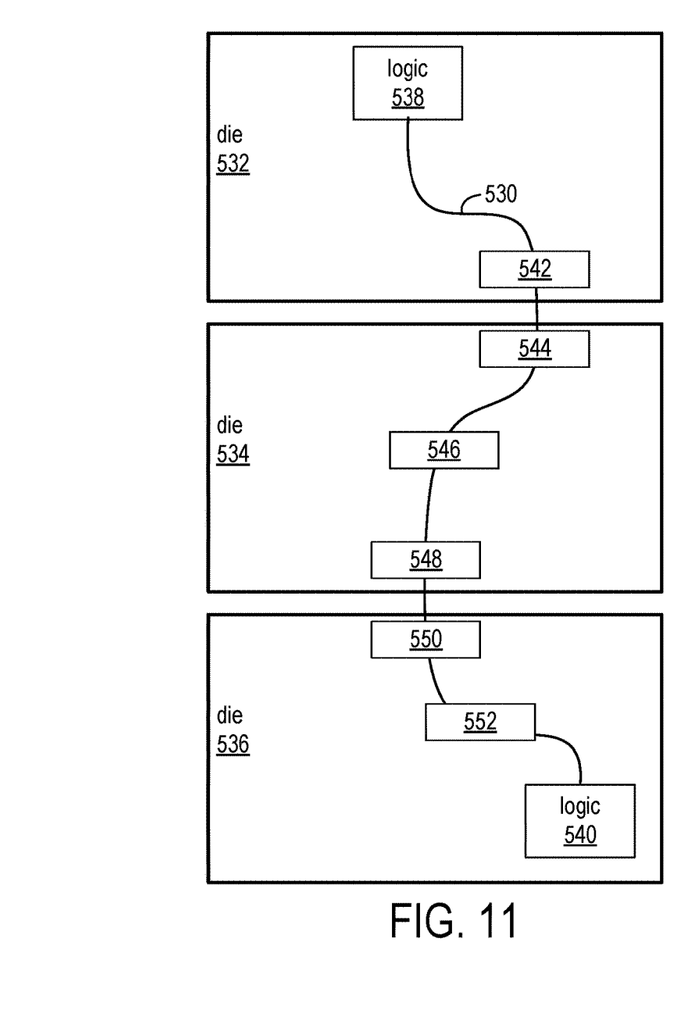
FIG. 11 continues the example of FIGS. 9 and 10, with equal spacing of the pipeline registers.

FIG. 11 continues the example of FIGS. 9 and 10, with equal spacing of the remaining pipeline registers 546 and 552 in the signal path 530, consistent with processing of block 312 of FIG. 6.

Figure 12:
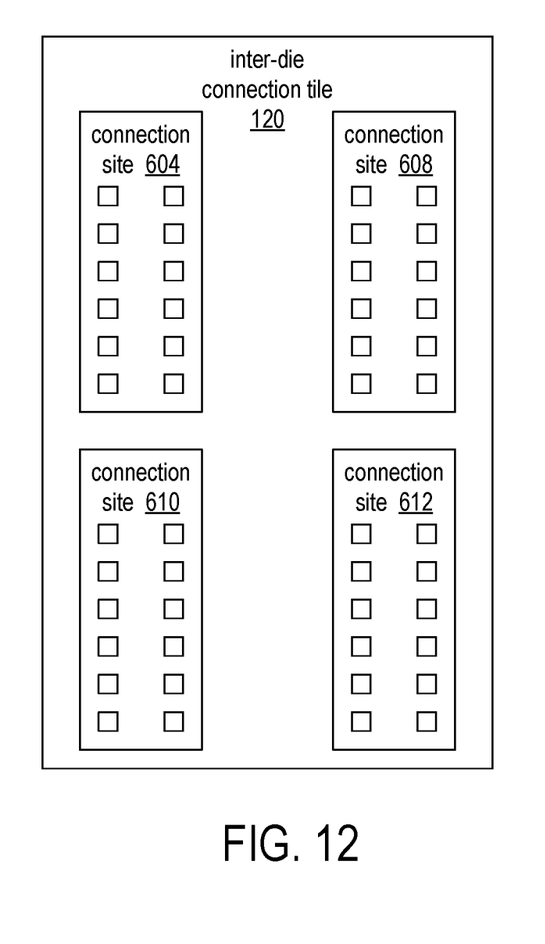
FIG. 12 shows an exemplary inter-die connection tile.

FIG. 12 shows an exemplary inter-die connection tile 120. The inter-die connection tiles provide connectivity between dice through signal lines (not shown) that connect to transmit flip-flops or receive flip-flops within connection sites 604, 608, 610, and 612. In an exemplary die, each inter-die connection tile can contain four connection sites, each site having six bi-directional inter-die connection lines.

Figure 13:
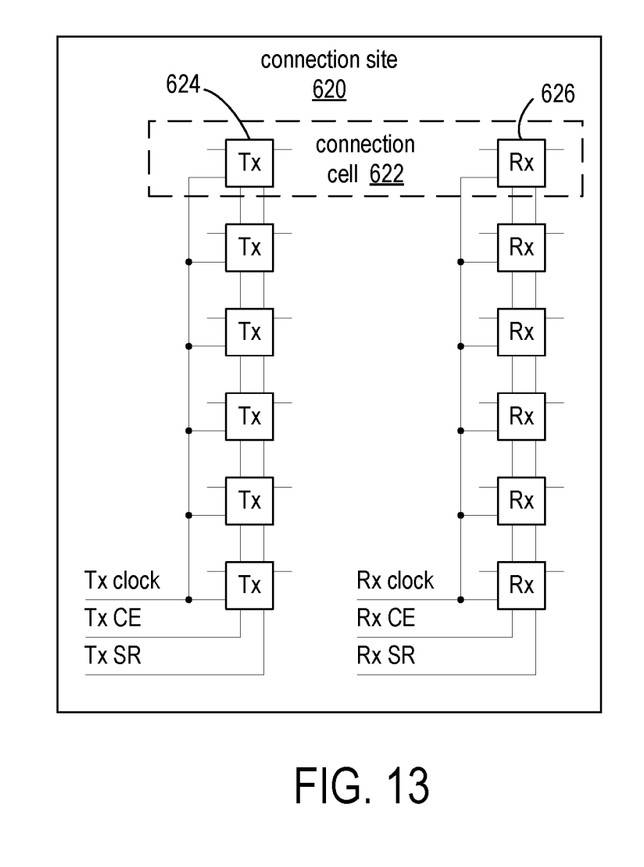
FIG. 13 shows an exemplary connection site of an inter-die connection tile.

FIG. 13 shows an exemplary connection site 620 of an inter-die connection tile. The connection site 620 includes multiple connection cells. Each connection cell includes a transmit flip-flop and a receive flip-flop. For example, connection cell 622 includes transmit flip-flop 624 and receive flip-flop 626. Each connection cell is paired with one and only one connection cell of an inter-die connection tile on a different die. The output of the transmit flip-flop and the input of the receive flip-flop of a connection cell connect to the same inter-die signal line.

The transmit flip-flops in a connection site are controlled by shared Tx clock, Tx CE and Tx SR signals, and the receive flip-flops are controlled by shared Rx clock, Rx CE and Rx SR signals. The data input signal to each transmit flip-flop can be connected to a signal generated from logic on the same die as that of the inter-die connection tile. Likewise, the data output signal from each receive flip-flop can be connected to logic on the same die as that of the inter-die connection tile.

Each of the inter-die signal lines can span the number of tiles in the columns of inter-die connection tiles of the stacked die. Thus, a device having a total of 60 inter-die connection tiles in a column that spans the stacked dice, can have 1440 inter-die signal lines (60 tiles*4 connection sites/inter-die connection tile*6 inter-die signal lines/connection site) for each column of inter-die connection tiles.

Figure 14:
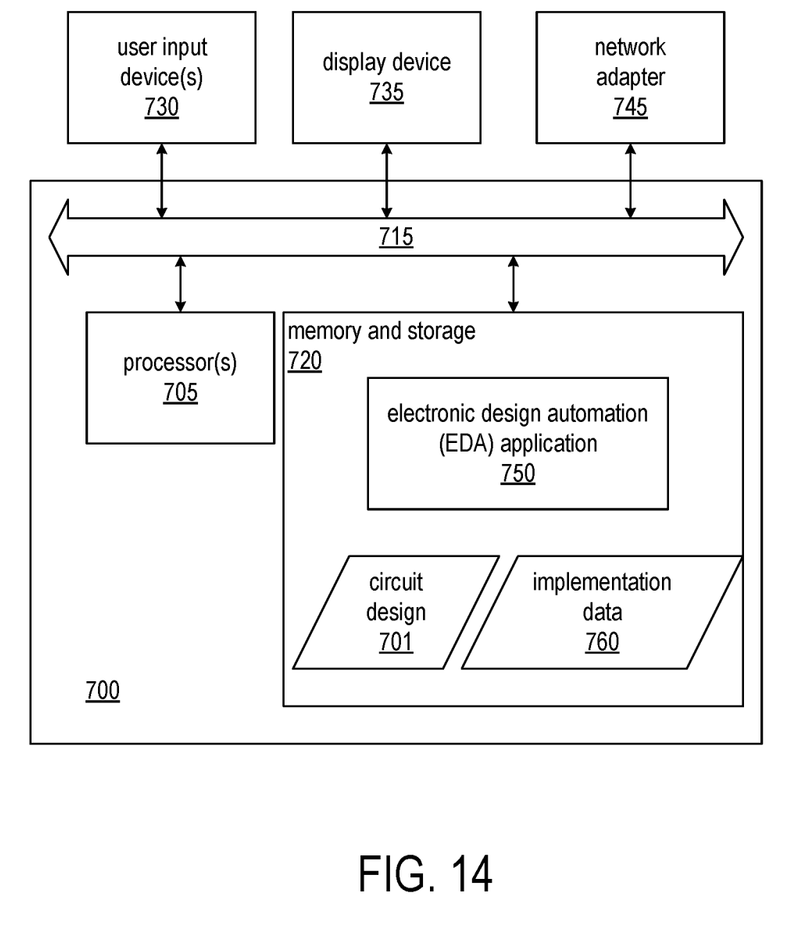
FIG. 14 is a block diagram illustrating an exemplary data processing system.

FIG. 14 is a block diagram illustrating an exemplary data processing system (system) 700. System 700 is an example of an EDA system. As pictured, system 700 includes at least one processor circuit (or "processor"), e.g., a central processing unit (CPU) 705 coupled to memory and storage arrangement 720 through a system bus 715 or other suitable circuitry. System 700 stores program code and circuit design 701 within memory and storage arrangement 720. Processor 705 executes the program code accessed from the memory and storage arrangement 720 via system bus 715. In one aspect, system 700 is implemented as a computer or other data processing system that is suitable for storing and/or executing program code. It should be appreciated, however, that system 700 can be implemented in the form of any system including a processor and memory that is capable of performing the functions described within this disclosure.

Memory and storage arrangement 720 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 700 may also include one or more cache memories (not shown) that provide temporary storage of at least some program code and data in order to reduce the number of times program code and data must be retrieved from local memory and persistent storage during execution.

Input/output (I/O) devices such as user input device(s) 730 and a display device 735 may be optionally coupled to system 700. The I/O devices may be coupled to system 700 either directly or through intervening I/O controllers. A network adapter 745 also can be coupled to system 700 in order to couple system 700 to other systems, computer systems, remote printers, and/or remote storage devices through intervening private or public networks. Modems, cable modems, Ethernet cards, and wireless transceivers are examples of different types of network adapter 745 that can be used with system 700.

Memory and storage arrangement 720 may store an EDA application 750. EDA application 750, being implemented in the form of executable program code, is executed by processor(s) 705. As such, EDA application 750 is considered part of system 700. System 700, while executing EDA application 750, receives and operates on circuit design 701.

In one aspect, system 700 performs a design flow on circuit design 701, and the design flow may include the identification of signals to be pipelined, floorplanning, global placement, detailed placement, and implementation as described herein. System 700 generates implementation data 760 from circuit design 701.

EDA application 750, circuit design 701, implementation data 760, and any data items used, generated, and/or operated upon by EDA application 750 are functional data structures that impart functionality when employed as part of system 700 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The methods and system are thought to be applicable to a variety of systems for automatically pipelining signal paths. Other aspects and features will be apparent to those skilled in the art from consideration of the specification. It is intended that the specification and drawings be considered as examples only, with a true scope of the invention being indicated by the following claims.

What is claimed is:

1. A method of pipelining signal paths in an integrated circuit (IC) device, the method comprising:
   receiving by a design tool executing on a computer system, a circuit design to be implemented in the integrated circuit device;
   identifying by the design tool, signals of the circuit design that require pipeline registers between drivers and loads of the signals;
   relaxing an initial timing requirement to a relaxed timing requirement;
   determining by the design tool, respective numbers of pipeline registers to insert between each driver and load of each of the signals based on the relaxed timing requirement;
   inserting by the design tool in the circuit design, respective sets of the respective numbers of pipeline registers between each driver and load of each of the signals; and
   placing by the design tool, the respective sets of the pipeline registers on the IC device using the initial timing requirement.

2. The method of claim 1, wherein the identifying includes identifying the signals having source code specifications of attributes associated with the signals, and the attributes indicating insertion of pipeline registers.

3. The method of claim 1, wherein:
   the identifying includes:
      identifying the signals having source code specifications of group attributes associated with the signals, the group attributes indicating insertion of pipeline registers, and
      identifying one or more groups of the signals based on the group attributes, each group of signals including two or more of the signals having a same value of the group attribute; and
   the inserting includes limiting a total number of pipeline registers inserted between a first driver and a first load of a group and between a second driver and a second load of the group to a maximum number indicated by a limit attribute of the group.

4. The method of claim 3, wherein the relaxing the initial timing requirement to the relaxed timing requirement includes determining the relaxed timing requirement as a function of a period of a clock signal and the maximum number.

5. The method of claim 3, wherein the limiting includes inserting equal numbers of pipeline registers between the first driver and the first load of the group and between the second driver and the second load of the group.

6. The method of claim 5, wherein:
   the determining the respective numbers of pipeline registers includes determining for each group of the one or more groups, a greatest number of pipeline registers of the respective numbers of pipeline registers; and
   each of the equal numbers of pipeline registers between drivers and loads of the signals of each of the one or more groups, is the greatest number.

7. The method of claim 1, wherein the placing the respective sets of the pipeline registers includes:
   determining respective pipeline paths between the drivers and the loads.

8. The method of claim 1, further comprising:
   partitioning by the design tool, the circuit design across different IC dice of the IC device based on the relaxed timing requirement, wherein partitioning assigns a driver of each signal of one or more of the signals to one of the different IC dice and assigns one or more loads of the one or more of the signals to another one of the different IC dice; and
   wherein the placing includes placing the respective sets of the pipeline registers on the IC dice using the initial timing requirement.

9. The method of claim 8, wherein the placing includes placing, for each signal having a driver and one or more loads assigned to different IC dice, one pipeline register on an inter-die connection tile of the IC die of the driver and one pipeline register on an inter-die connection tile of the IC die of each load of the one or more loads.

10. The method of claim 1, further comprising:
    determining ones of the respective sets that can be placed and routed in parallel; and
    wherein the placing includes starting parallel execution threads on the computer system to perform the placing of the ones of the respective sets.

11. The method of claim 1, further comprising:
    generating a model of the IC device in memory of the computer system, wherein the IC device has a plurality of tiles of circuit resources available for placement of the respective sets of pipeline registers, and the model includes for each tile an input node, an output node, and an edge that connects the input node to the output node, and the model includes a plurality of edges that represent available signal paths between tiles; and
    wherein the placing includes selecting placements on the plurality of tiles, of each pipeline register of the respective sets of the pipeline registers, based on lengths of signal paths between the plurality of tiles and utilization of the circuit resources of the plurality of tiles.

12. The method of claim 1, further comprising:
    generating configuration data to implement the circuit design on the IC device; and
    configuring the IC device with the configuration data to implement the circuit design.

13. A system comprising:
    one or more computer processors; and
    a memory arrangement coupled to the one or more computer processors, wherein the memory arrangement is configured with instructions for pipelining signal paths of a circuit design to be implemented on an integrated circuit (IC) device, and the instructions when executed by the one or more computer processors cause the one or more computer processors to perform operations including:
receiving a circuit design to be implemented on the IC device;
identifying signals of the circuit design that require pipeline registers between drivers and loads of the signals;
relaxing an initial timing requirement to a relaxed timing requirement;
determining respective numbers of pipeline registers to insert between each driver and load of each of the signals based on the relaxed timing requirement;
inserting respective sets of the respective numbers of pipeline registers between each driver and load of each of the signals; and
placing the respective sets of the pipeline registers on the IC device using the initial timing requirement.

14. The system of claim 13, wherein the instructions for identifying include instructions that when executed by the one or more computer processors cause the one or more computer processors to identify the signals having source code specifications of attributes associated with the signals, and the attributes indicating insertion of pipeline registers.

15. The system of claim 13, wherein:
the instructions for identifying include instructions that when executed by the one or more computer processors cause the one or more computer processors to:
identify the signals having source code specifications of group attributes associated with the signals, the group attributes indicating insertion of pipeline registers, and
identify one or more groups of the signals based on the group attributes, each group of signals including two or more of the signals having a same value of the group attribute; and
the instructions for inserting include instructions that when executed by the one or more computer processors cause the one or more computer processors to limit a total number of pipeline registers inserted between a first driver and a first load of a group and between a second driver and a second load of the group to a maximum number indicated by a limit attribute of the group.

16. The system of claim 15, wherein the instructions for relaxing the initial timing requirement to the relaxed timing requirement include instructions that when executed by the one or more computer processors cause the one or more computer processors to determine the relaxed timing requirement as a function of a period of a clock signal and the maximum number.

17. The system of claim 15, wherein the instructions for limiting include instructions that when executed by the one or more computer processors cause the one or more computer processors to insert equal numbers of pipeline registers between the first driver and the first load of the group and between the second driver and the second load of the group.

18. The system of claim 17, wherein:
the instructions for determining the respective numbers of pipeline registers include instructions that when executed by the one or more computer processors cause the one or more computer processors to determine for each group of the one or more groups, a greatest number of pipeline registers of the respective numbers of pipeline registers; and
each of the equal numbers of pipeline registers between drivers and loads of the signals of each of the one or more groups, is the greatest number.

19. The system of claim 13, wherein the instructions for placing the respective sets of the pipeline registers include instructions that when executed by the one or more computer processors cause the one or more computer processors to determine respective pipeline paths between the drivers and the loads.

20. The system of claim 13, wherein:
the memory arrangement is configured with instructions that when executed by the one or more computer processors cause the one or more computer processors to partition the circuit design across different IC dice of the IC device based on the relaxed timing requirement, wherein partitioning assigns a driver of each signal of one or more of the signals to one of the different IC dice and assigns one or more loads of the one or more of the signals to another one of the different IC dice; and
the instructions for placing include instructions that when executed by the one or more computer processors cause the one or more computer processors to place the respective sets of the pipeline registers on the IC dice using the initial timing requirement.

* * * * *